US007936077B2

(12) United States Patent
Lehoczky

(10) Patent No.: US 7,936,077 B2
(45) Date of Patent: May 3, 2011

(54) INTERNAL FLUID HANDLING FOR HYDRO-GENERATOR SUBMERGED IN WATER

(76) Inventor: Kalman N. Lehoczky, Manatee County, FL (US)

( * ) Notice: Subject to any disclaimer, the term of this patent is extended or adjusted under 35 U.S.C. 154(b) by 421 days.

(21) Appl. No.: 12/152,963

(22) Filed: May 19, 2008

(65) Prior Publication Data

US 2009/0284017 A1 Nov. 19, 2009

(51) Int. Cl.
*F03B 13/00* (2006.01)
*H02P 9/04* (2006.01)

(52) U.S. Cl. ........................................... 290/43; 290/54

(58) Field of Classification Search .................... 290/54, 290/43; 60/398, 698; 415/3.1
See application file for complete search history.

(56) References Cited

U.S. PATENT DOCUMENTS 2,501,696 A * 3/1950 Souczek ........................ 290/43
5,798,572 A * 8/1998 Lehoczky ...................... 290/54
6,104,097 A * 8/2000 Lehoczky ...................... 290/54
6,531,788 B2 * 3/2003 Robson .......................... 290/43
7,442,002 B2 * 10/2008 Mondl ............................. 415/7
7,492,054 B2 * 2/2009 Catlin ............................ 290/54
7,682,126 B2 * 3/2010 Parker ........................... 415/3.1
2008/0164698 A1 * 7/2008 Habets .......................... 290/44
2009/0134623 A1 * 5/2009 Krouse .......................... 290/43

* cited by examiner

*Primary Examiner* — Julio C. Gonzalez

(57) ABSTRACT

Hydro-generator unit submerged in water comprised of watertight bulb housing containing a combination of converter transforming the hydraulic energy into mechanical power, drive train transmitting the mechanical power to generator that converts the mechanical power into electricity or into energy bearing media and auxiliary equipment serving control and measurement purpose and wherein all cavities in the watertight bulb housing, converter, drive train, generator and auxiliary equipment are filled with fluid.

3 Claims, 1 Drawing Sheet

INTERNAL FLUID HANDLING FOR HYDRO-GENERATOR SUBMERGED IN WATER

BACKGROUND OF THE INVENTION

1. Field of the Invention

The present invention relates to hydro-generators submerged in water converting the hydraulic energy of currents, waves and other the movements into other energy, such as electricity, hydrogen gas, or other energy-bearer. Typically, these units have an energy converter transforming the hydraulic energy into mechanical energy, for example through rotating turbine runner, displacement bodies, foils, buoys, and pneumatic or other devices. The mechanical energy is transmitted through the so-called drive train to the hydro-generator's generator. Typically the drive train and the generator is contained in a bulb housing separating the surrounding water from the gas or air filled internal space housing the drive train, the generator and the auxiliary equipment. The drive train consists of a combination of bearings, shafts, couplings, transmissions, sealing, hydraulic and mechanical components. The generator part of the hydro-generator unit converts the mechanical energy supplied through the drive train into other form of energy, such as electricity, hydrogen or other energy-bearer. The additional auxiliary equipment may provide for removal of leakage water, measurement, control and protective actions.

2. Description of the Prior Art

There is several known design for utilization of the kinetic energy in the free flowing rivers, ocean currents or tidal water movement. Typically, these design ideas address the positioning of the device in relation to the water surface, the bottom or the device's orientation in relation to the current's direction. For example it is known design where a distinctive part of the device act as a flotation chamber. This chamber may contain a fluid, eventually from the surrounding water, with adjustable level to ensure the vertical positioning of the floatation chamber and the attached water turbine in relation to the free water surface. In this case the fluid is not in connection with the energy converter for example air compressor and it's drive train, which is contained, in a completely separated nacelle. It should be noted that the energy transmission via compressed air is far inferior to the electrical system where the rotational movement can be directly introduced into an electric generator while the compressed air transmission contains two additional energy conversion components, the air compressor and the air turbine, which are known to have very poor efficiency. The problems relating to handling of the moving ice covering the free water surface and the introduction of typically humid air into the nacelle containing the air compressor remains unresolved.

The problem with the above and all type of submersed equipment is the prevention of water intrusion from the surrounding into the gas or air filled bulb housing, sometimes called nacelle, in order to protect the drive train, generator and auxiliary equipment from the effect of water and how to the replace the gas or air leaking out from the bulb housing. The prior solutions were based on balancing the pressure of the internal gas or air atmosphere in relation to the surrounding water pressure. This could be achieved by having an automatic control system that pumps the leakage water out from the bulb housing Typically, the energy needed for the pump action could be generated by the hydro-generator. However, the replacement of the lost gas may be a demanding task. There are three major options: A compressed gas container may be used as a reservoir, a pipeline may carry in the gas from the shore or the gas may be produced inside the unit for example through electrolysis. All these options have some disadvantage. The compressed gas reservoir must be refilled from time to time causing indispensable and costly maintenance operations. The compressed gas line from the shore to the bulb housing might be damaged and in stead of supplying gas, the gas may escape from the bulb housing through the leaking pipe line. The third option, with gas generation inside the bulb housing would surely introduce many additional components and costs or this solution would be primarily reserved for hydro-generator units which has hydrogen and not electricity as main energy product.

SUMMARY OF THE INVENTION

The invention relates to hydro-generating unit, submerged in water, comprising of a water tight bulb housing containing the drive train that transports and converts the hydraulic energy of currents, waves and other water movements first into mechanical energy and thereafter into electrical, hydrogen gas, or other energy bearer and the internal space of the bulb housing is filled with fluid except an uppermost limited space inside the bulb housing and part of an expansion chamber capable to accept the excess fluid volumes created by heat expansions.

BRIEF DESCRIPTION OF THE DRAWINGS

In accordance with this invention a hydro generator installed inside of a water tight bulb housing that is submerged in free flowing water where the bulb housing contains in addition to the generator also components of the drive train, shafts, bearings, transmissions and auxiliary equipment, all free space inside the bulb housing including the internal spaces of the generator, drive train, shafts, bearings and auxiliary equipment, is completely filled with fluid except a limited space at the ceiling of the bulb and a limited space in an expansion chamber that may contain compressible gas. The terms compressible and incompressible are not absolute but relative terms expressing the relatively higher compressibility of gaseous substances in relation to the typically incompressible fluids.

The following description is an example showing a hydro-generator based on rotating turbine runner and mainly rotating components. However, this invention is not limited on this design but covers also hydro-generators with non-rotating reciprocating, pneumatic or hydraulic components.

Figure 1:
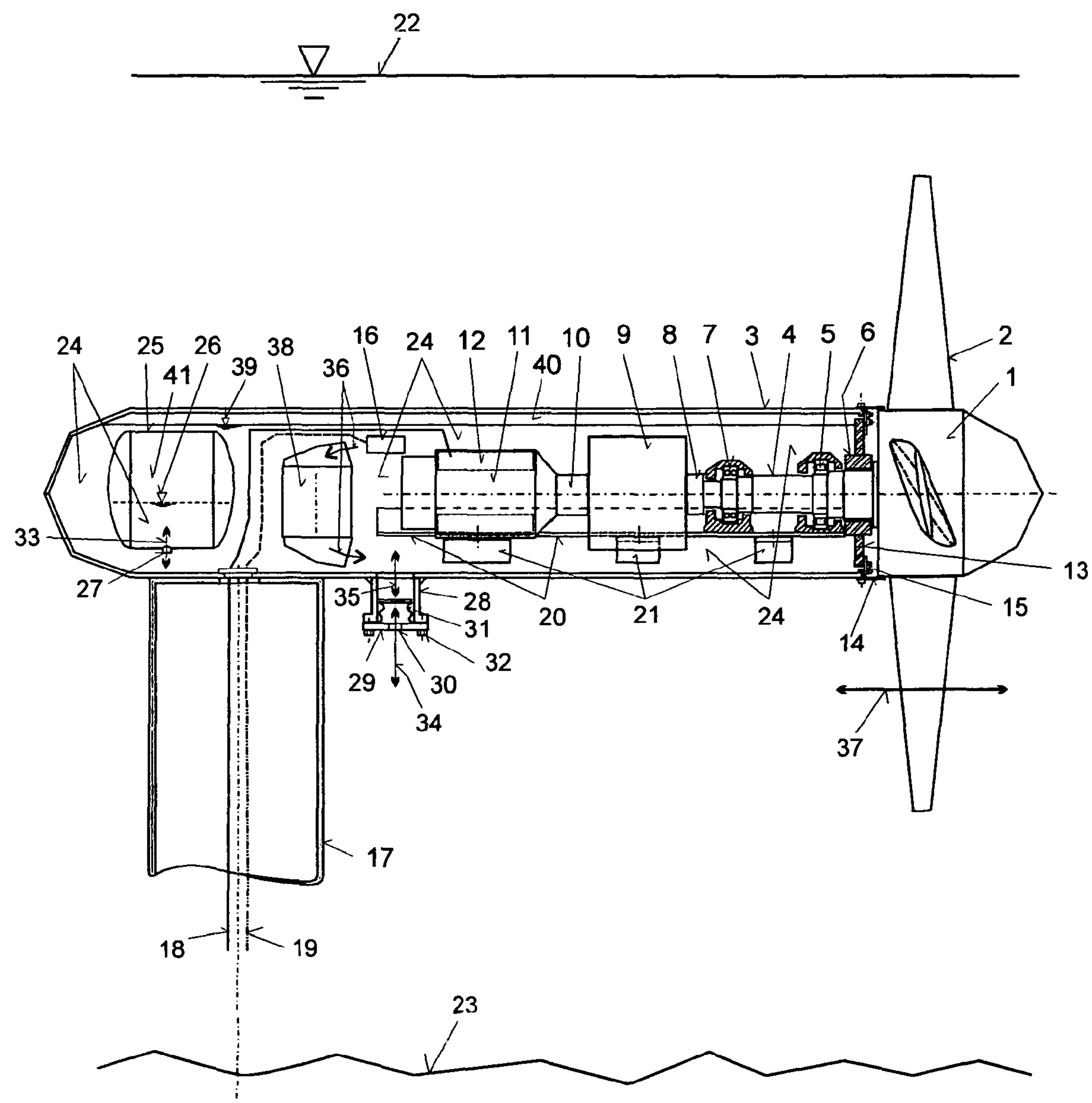
FIG. 1—shows the longitudinal cross section of turbine type hydro-generator unit in accordance with the invention. The hydro-generator unit is positioned below the water surface 22 and above the bottom 23 of water body that may flow in changing direction 37.

The hydro-generator's turbine runner consisting of hub 1 and blades 2, is arranged at the end of the bulb housing 3. The bulb housing is a large diameter steel tube. The turbine shaft 4 enters into the housing through a shaft seal 6 that can be a minimum leak and minimum wear mechanical seal. The shaft seal is installed in a plate 13 perpendicular to the shaft 4 which plate 13 at the outer periphery is connected to the housing 3 by flexible sealing 15. A thin cover plate 14 is mounted on the housing covering the gap between the rotating turbine hub 1 and the stationary housing 3. The purpose of the plate 14 is to prevent that larger object to enter into the gap between the plate 13 and the turbine hub 1.

The turbine shaft 4 is supported in two bearings 5 and 7. Bearing 7 is designed both for radial and axial shaft forces. A shaft coupling 8 connects the turbine shaft 4 and the low-speed shaft of the speed-increasing gear 9. The outgoing high-speed shaft of the speed increaser and the shaft of the generator 11 are connected by a shaft coupling 10.

The generator 11 with the complete drive train consisting of the speed increasing transmission 9, bearings 5 and 7 supporting the shaft 4 are assembled on a common frame 20 removable from the brackets 21 integral with the bulb housing 3.

The generator 11 in this case assumed to be a synchronous generator. In order to make the generator maintenance-free a so-called brushless design is chosen. A brushless design means that the rotor contains permanent magnets or the rotor is equipped with field windings which get a direct current supply from the rotor of an excitation machine which is installed on common shaft with the generator rotor. In this case the current from the excitation machine can go directly to the synchronous generator's rotor coils without passing through a brush-collector-ring system. This latter arrangement usually contains diodes installed in the rotating system converting the excitation machine's alternating current into direct current. The direct current is fed into the synchronous generator's rotor coils. The generator stator 12 supplies alternating current (AC), in this case a three-phase current through the main leads 18. This current may have a changing voltage level and frequency dependent on the rotational speed of the generator and turbine shaft. An automatic that is part of the auxiliary equipment that controls the excitation machine's stator current supply may stabilize the voltage. Of course this is not the case at a permanent magnet excited generator rotor. The type of generator does not limit the application area of this invention.

FIG. 1 shows an arrangement where the bulb housing 3 is rigidly connected to a vertical pole 17. However, the bulb housing 3 may be designed to turn in the horizontal plane with the pole 17 as a rotation center. The moving freedom ensures that the turbine can automatically turn into the flow direction of surrounding water. The arrangement and design of the pole, for example its support in relation to the bottom 23 or from above does not influence the validity of this invention.

FIG. 1 shows that the hydro-generator system may be served by an electronic control and data-acquisition system 16 as part of the auxiliary equipment with cable connection 19 to a control center on the shore.

In accordance with the invention, the free space inside of the bulb housing 24 is filled with fluid 24 covering at least the shaft seal 6 and all sensitive location where leakage between the outside water and the inside of the bulb housing may occur. The uppermost narrow space 40 in the bulb housing above the level 39 may be filled with gas. Also the free volumes inside the generator and components of the drive train are filled with fluid. The fluid in the bulb housing 3 and inside the different parts of the generator and drive train may be identical or different satisfying different requirements with respect to electric insulation capacity, viscosity, heat transfer capacity, etc. However, it is an advantage if a common fluid is used everywhere suitable for all application area. For example there are electrical machines where the rotor is running in water while the stator 12 is filled with a different kind of fluid with better electrical insulation properties. There are bearings used in the industry for operation with a wide variety of lubricating mediums, gas, water, oil, grease, etc. The type of the bearings used, for example hydrodynamic, spiral groove, roller bearing, etc. does not limit the validity of this invention. Finding a common fluid filling all needs is not a major obstacle.

The major advantage of this invention is that sealing system, for example the shaft seal 6 separating the internal fluid from the surrounding water is less of a technical challenge than separation of a internal gas from the surrounding water especially if the very different thermal expansion of a gas and a fluid is considered FIG. 1 shows a few special features in accordance with this invention. There is an expansion tank 25 that is partially filled with gas 41. At the bottom of the tank an opening 27 is arranged through which the fluid 24, driven by the heat expansion, can enter the expansion tank 25 compressing the gas 41 in the upper region of the tank 25. The gas 41 acts like a spring. The separation line or level 26 between the fluid 24 and the gas 41 depends on the thermal conditions inside the bulb housing 3. At higher temperatures the fluid 24 expands, intrudes into the tank 25 and pushes the level 26 higher. There will be an alternating exchange 33 of fluid, inward and outward through the opening 27 depending on the operational condition influencing the temperatures. The invention covers also design variants where the tank 25 contains a flexible wall such as membrane or piston with mechanical spring backing to permit a controlled expansion of the fluid 24.

Another feature of the invention is the pressure-balancing device between the surrounding water and the fluid 24 inside the bulb housing 3. FIG. 1 shows an easily accessible device consisting of a tube 28, flange 29, screws 32 and flexible membrane or bellow 31 system. The term membrane was used to describe a movable or flexible wall completely and leakage free separating the fluid 24 from the external free moving water. A piston with perfect sealing inside a cylinder would constitute a movable wall equivalent to a membrane. FIG. 1 shows a flexible bellow type membrane 31 with a flat top. The surrounding water can enter or exit the flange's opening 30 but remain separated by the flexible membrane 31 from the fluid 24 that is above and communicating with flexible membrane 31 from the fluid 24 that is above and communicating with the internal space of the bulb housing 3. If the pressure increases or decreases in the fluid 24, it moves 35 downward or upward forcing the membrane 31 to push or pull 34 the water out or pull into the device.

The expansion tank 25 and the above described device with the membrane 31 are completing each other in stabilizing the pressure in the bulb housing 3 and minimizing the pressure exposure of the sealing components such as the shaft seal 6.

In accordance with the invention the fluid 24 acting as a cooling medium transferring heat from the generator and drive train to the bulb housing 3 will benefit from a circulation pump 38 promoting the motion and heat transfer capacity of the fluid 24. The flow's 36 direction in and out of the circulation pump and the distribution by ducts and guides shall be adapted to the local conditions and the design of the circulation pump 38, the pump control, duct and guide system shall not limit the validity of this invention.

What is claimed is:

1. An entirely submerged hydro-generator unit comprising:

a watertight bulb housing and drive train consisting of a mechanical transmission, bearing, generator and an auxiliary equipment wherein all cavities of the watertight bulb housing and mechanical transmission, bearing, generator and auxiliary equipment are filled with fluid; and the hydro-generator unit contains an expansion tank partially filled with fluid and where the lower wall of the tank is equipped with an entrance opening communicating with other fluid filled spaces in the bulb housing; and the expansion tank is equipped with a flexible wall with a mechanical spring loading permitting and controlling the expansion of the fluid.

2. The entirely submerged hydro-generator unit of claim 1, wherein the unit is filled with identical fluid in all parts of the bulb housing including the internal volumes contained by the drive train consisting of the mechanical transmission, bearing, generator and the auxiliary equipment.

3. The entirely submerged hydro-generator unit of claim 1, wherein a device with a flexible membrane separates the internal fluid from surrounding water.

* * * * *